US009681033B2

United States Patent
McCall et al.

(10) Patent No.: US 9,681,033 B2
(45) Date of Patent: Jun. 13, 2017

(54) SYSTEM FOR TRACKING CABLE TETHERED FROM MACHINE

(71) Applicant: Caterpillar Inc., Peoria, IL (US)

(72) Inventors: Robert C. McCall, Pittsburgh, PA (US); Qi Wang, Pittsburgh, PA (US); Louis A. Bojarski, Coraopolis, PA (US)

(73) Assignee: Caterpillar Inc., Peoria, IL (US)

( * ) Notice: Subject to any disclaimer, the term of this patent is extended or adjusted under 35 U.S.C. 154(b) by 249 days.

(21) Appl. No.: 14/679,037

(22) Filed: Apr. 6, 2015

(65) Prior Publication Data

US 2015/0213605 A1    Jul. 30, 2015

(51) Int. Cl.
*H04N 5/225* (2006.01)
*G06T 7/564* (2017.01)
*H04N 5/232* (2006.01)

(52) U.S. Cl.
CPC .......... *H04N 5/2256* (2013.01); *G06T 7/564* (2017.01); *G06T 2207/10012* (2013.01); *G06T 2207/30108* (2013.01); *H04N 5/23229* (2013.01)

(58) Field of Classification Search
CPC .............................. G06T 7/564; H04N 5/2256
See application file for complete search history.

(56) References Cited

U.S. PATENT DOCUMENTS

| | | | |
|---|---|---|---|
| 6,678,394 B1 | 1/2004 | Nichani | |
| 7,272,474 B1 | 9/2007 | Stentz et al. | |
| 7,793,442 B2 | 9/2010 | Koch et al. | |
| 7,958,982 B2 * | 6/2011 | Everett | B60Q 1/52 191/12 R |
| 8,332,106 B2 | 12/2012 | Yuet et al. | |
| 2012/0095651 A1 * | 4/2012 | Anderson | G05D 1/0274 701/50 |
| 2014/0107882 A1 | 4/2014 | Tojima et al. | |
| 2014/0236477 A1 * | 8/2014 | Chen | G05D 1/0257 701/450 |

* cited by examiner

*Primary Examiner* — Tung Vo
*Assistant Examiner* — Rowina Cattungal

(57) ABSTRACT

A system for locating a cable tethered from a machine along a worksite is disclosed. The system includes a laser scanner and a color camera. A location unit generates a position of the machine. The system includes a processing device disposed on the machine and in communication with the laser scanner, the color camera and the location unit. The processing device determines a location of the cable based on signals from the laser scanner and the color camera. The system further includes a server remotely located with respect to the machine and disposed in communication with the processing device. The server is configured to record locations of the cable at different instances of time and generates a map of the cable based on the locations of the cable.

1 Claim, 3 Drawing Sheets

SYSTEM FOR TRACKING CABLE TETHERED FROM MACHINE

TECHNICAL FIELD

The present disclosure relates to a system for tracking a cable tethered from a machine.

BACKGROUND

Machines, such as excavators, mining shovels, loaders, drills and the like, are typically used for mining or other earth moving operations. In some cases, such machines may be either electrically powered by a remotely located power source. For example, drills which are employed to create holes in the earth sub-surface may be connected to the remote power source, such as an electrical generator, via electric cables that are tethered to a rear portion of the electric drills. The electric cables may be running along the ground of the worksite during operation of the machine and may run off a spool that allows the operating cable length to change as needed as the machine moves from one work location to another. As an electric drill moves from one drilling position to another drilling position to execute a desired operation, the position of a tethered electric cable will change. As a result, the position of an electric cable in these operations may be difficult to track, which can be problematic for other machines operating on the site.

Off-highway trucks and other machines typically found on a worksite may need to navigate in the vicinity of the remotely powered machine. For example, off-highway trucks may move to and from an excavating location to transport the earthen material from the worksite. An operator of the off-highway truck may have to avoid contact with the electric cables so as to prevent damage to both the electric cables and the truck. However, mobility and navigation around the electric cables may be difficult because the operator may be unable to see the ground, and thus locate the electric cables near the truck. Environmental and site conditions may also impede an operator's ability to locate the cable.

For reference, U.S. Pat. No. 7,793,442 (the '442 patent) discloses an avoidance system for a mobile earthmoving machine is disclosed. The avoidance system includes a sensor system configured to periodically detect a position of a cable tethered from the machine within a worksite and generate a position data set in response thereto. A controller is associated with the sensor system and configured to determine a cable avoidance region based on the position data set. However, the sensor system of the '442 patent may not provide accurate positioning of the cable with respect of the machine as combining data from two or more sensors is not performed.

SUMMARY OF THE DISCLOSURE

In an aspect of the present disclosure, a system for tracking a cable tethered from a machine along a worksite at or above a surface of the worksite during operation is provided. The system includes a laser scanner which is configured to emit a laser beam and scan a surrounding area of the machine within a field of view of the laser scanner. The system further includes a color camera which is configured to generate images of the surrounding area of the machine within a field of view of the color camera. The system further includes a location unit configured to generate a location of the machine.

The system also includes a processing device disposed on the machine and in communication with the laser scanner, the color camera and the location unit. The processing device includes a reconstruction module configured to receive data from the laser scanner and generate a three dimensional model of the surrounding area of the machine within the field of view of the laser scanner. The processing device also includes an image module which is configured to receive data from the color camera and generate a two dimensional color image of the surrounding area of the machine within the field of view of the color camera. The processing device also includes a first cable detection module configured to receive the three dimensional model from the reconstruction module. The first cable detection module is further configured to search for a cylindrical object in the three dimensional model and determine a first location of the cable with respect to the machine based on the location of the cylindrical object within the three dimensional model. The processing device also includes a second cable detection module configured to receive the color image from the image module. The second cable detection module is further configured to search for a pair of lines in the color image and determine a second location of the cable with respect to the machine based on the location of the pair of lines within the color image. The processing device also includes a fusion module configured to receive the location of the machine from the location unit, the first location of the cable from the first cable detection module and the second location from the second cable detection module. The fusion module is further configured to generate a location of the cable based on the location of the machine, the first location of the cable and the second location of the cable.

The system further includes a server remotely located with respect to the machine and disposed in communication with the processing device. The server is configured to record locations of the cable at different instances of time and generates a map of the cable based on the locations of the cable.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
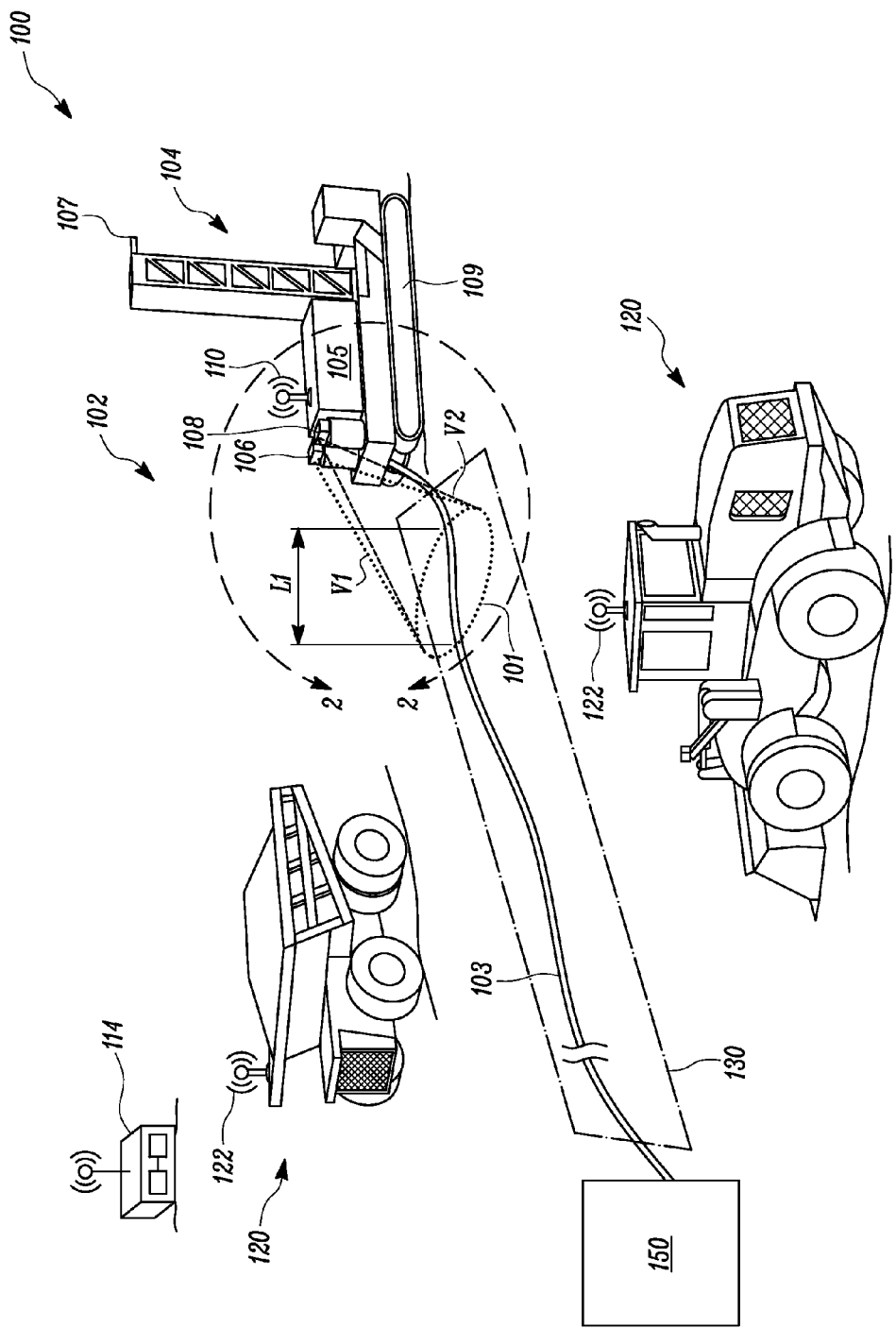
FIG. 1 illustrates a pictorial view of a worksite including a system for tracking a cable associated with a machine in the worksite, according to an embodiment of the present disclosure.

FIG. 1 shows a perspective view of a worksite 100. The worksite 100 may be a mine site, a landfill, a quarry, a construction site, or any other type of worksite. In a worksite, there may be multiple machines operable to perform various tasks. The tasks may include drilling, excavating, hauling, dumping, grading and the like. A machine 104 is shown to be operating at the worksite 100. In the illustrated embodiment, the machine 104 is a blasthole drill. However, the machine 104 may be a mining shovel, a loader, an excavator, a dozer, a mining truck or the like.

The machine 104 includes an implement 107 disposed on a body 105 of the machine 104. In the illustrated embodiment, the implement 107 may be drill. However, in alternate embodiments, the implement 107 may be a power shovel, a bucket, a ripper or the like. The machine 104 includes a set of ground engaging members 109 for propulsion and steering on the worksite 100. In the illustrated embodiment, the ground engaging members 109 are track assemblies. Alternatively, the ground engaging members 109 may be wheels. The machine 104 may further include one or more electric motors (not shown) configured to provide propulsion to the machine 104 and/or to actuate the implement 107.

As shown in FIG. 1, a cable 103 is tethered to the machine 104 at a rear end thereof. The cable 103 may be configured to transmit electric power to the electric motors from a power source 150. The power source 150 may be remotely located from the machine 104. The cable 103 may include one or more electrically conductive members, such as wires, encased within an outer casing. The power source 150 may also be located remotely with respect to the worksite 100. The power source 150, for example, may be an electrical power generator or a standard power grid or any other source of electrical power known in the art.

The machine 104 may travel along the worksite 100 to multiple locations. The machine 104 may also work in conjugation with one or more mobile equipment 120. The mobile equipment 120 may be, for example, an off-highway truck for transporting material from the worksite 100. In the illustrated embodiment, the mobile equipment 120 includes an off-highway truck and a loader. The mobile equipment 120 may be autonomously controlled or manually controlled by an operator.

Figure 2:
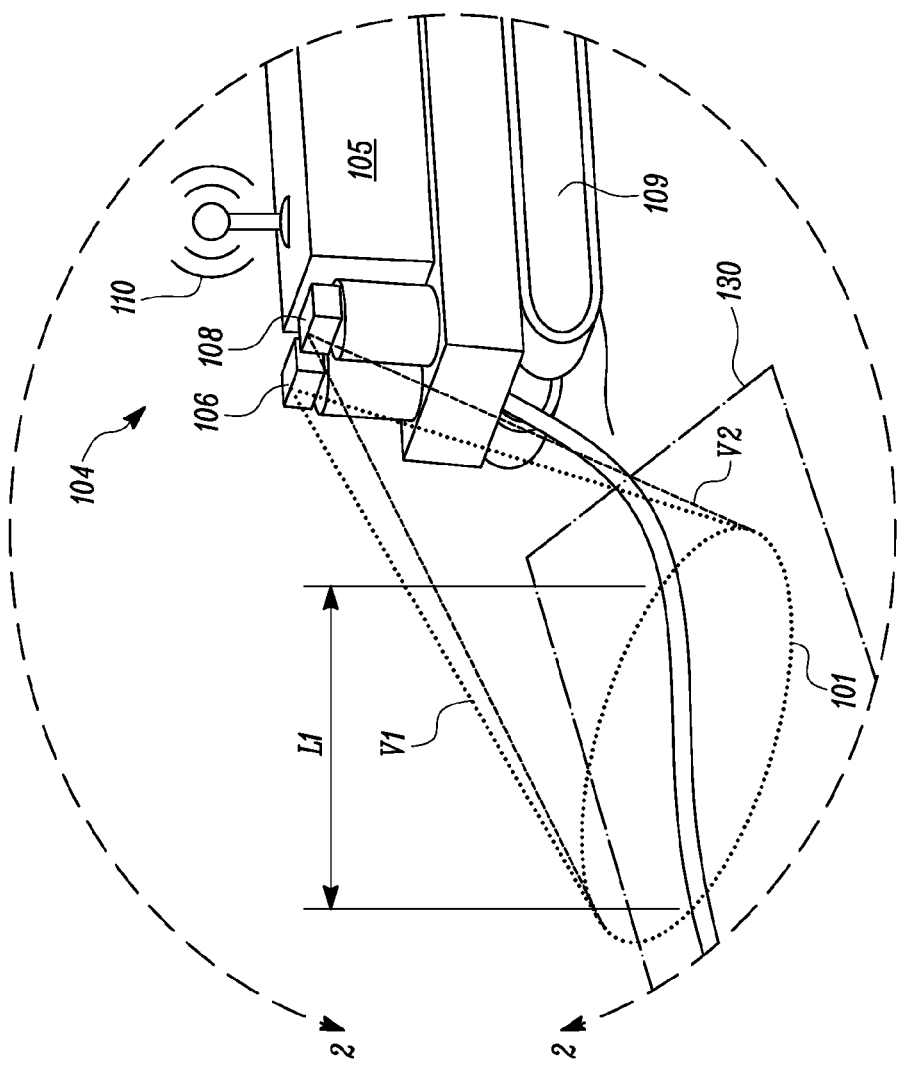
FIG. 2 illustrates an enlarged view of the encircled portion in FIG. 1 showing a rear part of the machine in FIG. 1.

Referring to FIGS. 1 and 2, a system 102 is provided to track the cable 103, according to an embodiment of the present disclosure. The system 102 includes a laser scanner 106 configured to emit a laser beam and scan a surrounding area 101 of the machine 104 within a field of view 'V1' of the laser scanner 106. The laser scanner 106 may be disposed on the body 105 of the machine 104. The laser scanner 106 may include a laser beam source (not shown) configured to emit a laser beam. The laser scanner 106 may continuously or periodically scan the surrounding area 101. The laser scanner 106 may be positioned on the machine 104 so as to have a sufficient field of view 'V1' to monitor the surrounding area 101 at the worksite 100 during travel of the machine 104. Specifically, the field of view 'V1' of the color camera 108 may be sufficient to cover portion of the cable 103 located at a rear.

The system 102 further includes a color camera 108 configured to generate images of the surrounding area 101 of the machine 104 within a field of view 'V2' of the color camera 108. The color camera 108 may be any camera known in the art configured to capture color images in a field of view. The color camera 108 may be disposed on the body 105 of the machine 104. The color camera 108 may be positioned on the machine 104 so as to have a sufficient field of view 'V2' to monitor the surrounding area 101 at the worksite 100 during travel of the machine 104. Specifically, the field of view 'V1' of the color camera 108 may be sufficient to cover portion of the cable 103 located at the rear of the machine 104.

The system 102 further includes a location unit 110 configured to generate a location of the machine 104. In an example, the location unit 110 may be disposed on the body 105 of the machine 104. However, it may be contemplated that the location unit 110 may be disposed at any location on the machine 104. The location unit 110 may be configured to generate a local or global coordinates of the machine 104 relative to the worksite 100. In an example, the location unit 110 may be a satellite positioning system, for example, a Global Positioning System (GPS). Thus, the location unit 110 may be configured to generate GPS coordinates of the machine 104.

Figure 3:
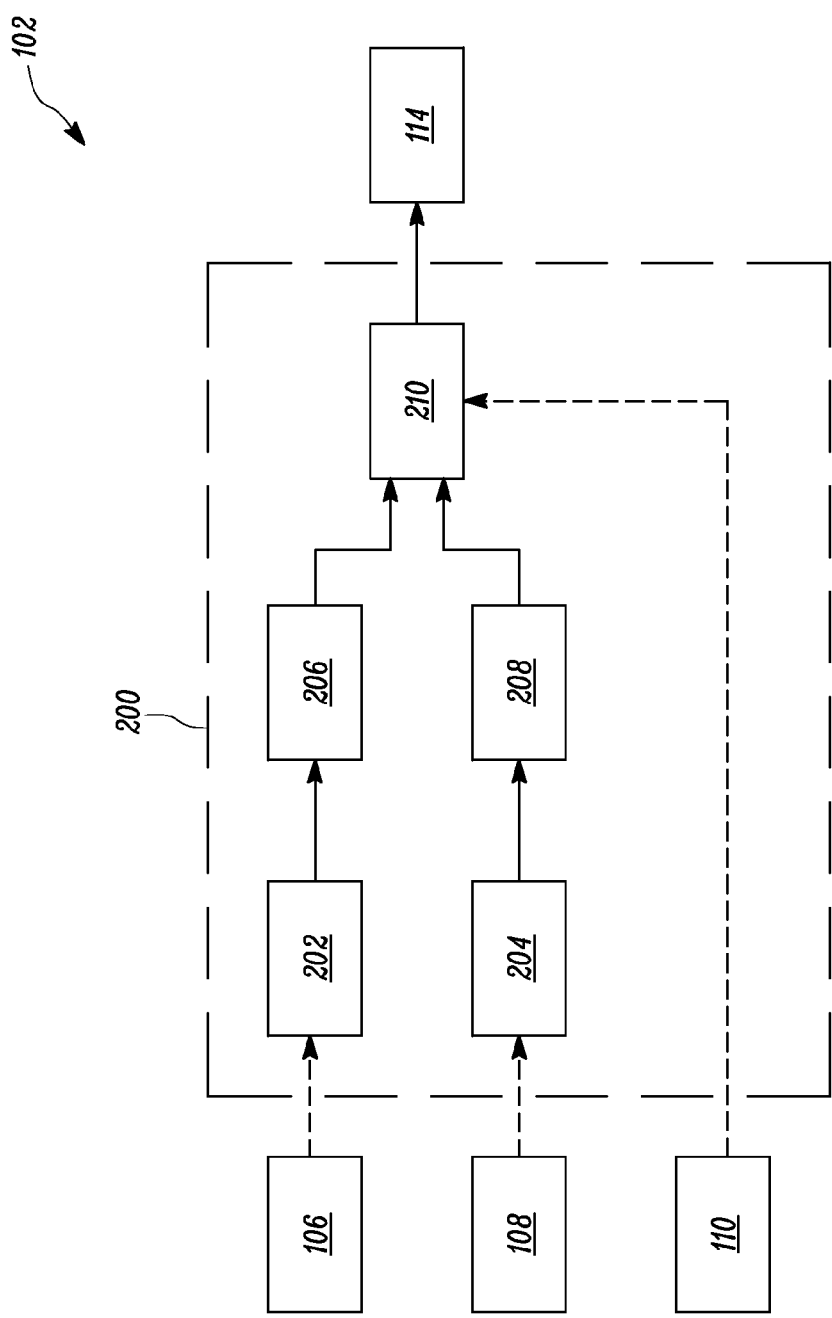
FIG. 3 is block diagram illustrating the system for tracking the cable associated with the machine, according to an embodiment of the present disclosure.

FIG. 3 illustrates a block diagram of the system 102, according to an embodiment of the present invention. Referring to FIGS. 2 and 3, the system 102 further includes a processing device 200 disposed on the machine 104. In an example, the processing device 200 may be disposed in an operator cab (not shown) of the machine 104. The processing device 200 may embody a single microprocessor or multiple microprocessors configured for receiving signals from the various components of the system 102. Numerous commercially available microprocessors may be configured to perform the functions of the processing device 200. It should be appreciated that the processing device 200 may embody a machine microprocessor capable of controlling numerous machine functions. A person of ordinary skill in the art will appreciate that the processing device 200 may additionally include other components and may also perform other functions not described herein.

The processing device 200 is configured to communicate with the laser scanner 106, the color camera 108 and the location unit 110. The processing device 200 includes a reconstruction module 202 disposed in communication with the laser scanner 106. The reconstruction module 202 is configured to receive data from the laser scanner 106 and generate a Three Dimensional (3D) model of the surrounding area 101 of the machine 104 within the field of view 'V1' of the laser scanner 106. The processing device 200 further includes an image module 204 disposed in communication with the color camera 108. The image module 204 is configured to receive data from the color camera 108 and generate a Two Dimensional (2D) color image of the surrounding area 101 of the machine 104 within the field of view 'V2' of the color camera 108.

The processing device 200 further includes a first cable detection module 206 disposed in communication with the reconstruction module 202. The first cable detection module 206 is configured to receive the 3D model from the reconstruction module 202. The first cable detection module 206 is further configured to search for one or more cylindrical objects in the 3D model received from the reconstruction module 202 and determine a first location of the cable 103 with respect to the machine 104 based on the locations of the cylindrical objects within the three dimensional model. In an embodiment, the first cable detection module 206 may be configured to detect 3D point clouds corresponding to cylindrical objects within the 3D model. Further, the first location of the cable 103 may include location of each of the cylindrical objects detected within the 3D model.

The processing device 200 further includes a second cable detection 208 module disposed in communication with image module 204. The image module 204 is configured to receive the color image from the image module 204. The second cable detection 208 module is further configured to search for one or more pairs of lines in the color image received from the image module 204 and determine a second location of the cable 103 with respect to the machine 104 based on the location of the pairs of lines within the color image. In an embodiment, each of the pairs of parallel lines is parallel to each other. Further, the second location of the cable 103 may include location of each of the pairs of parallel lines detected within the 2D color image.

The processing device 200 also includes a fusion module 210 disposed in communication with the location unit 110, the first cable detection module 206, and the second cable detection module 208. The first cable detection module 206 is configured to receive the location of the machine 104 from the location unit 110, the first location of the cable 103 from the first cable detection module 206 and the second location from the second cable detection module 208. The fusion module 210 may also be configured to combine the first location of the cable 103 received from the first cable detection module 206, and the second location of the cable 103 received from the second cable detection module 208. In an embodiment, the fusion module 210 may determine overlaps between the first location of the cable 103 and the second location of the cable 103. Specifically, the fusion module 210 may determine overlaps between locations of the cylindrical objects within the 3D model and the locations of the pairs of parallel lines within the 2D color image. The fusion module 210 may then implement a curve fitting algorithm on the overlaps between the first location and the second location, and determine length of each of the overlaps. The fusion module 210 may also be configured to compare the length of each of the overlaps with a preset threshold 'L'. The preset threshold 'L' may correspond to a minimum of a length 'L1' (shown in FIG. 1) of the field of view 'V1' of the laser scanner 106 and a length 'L2' of the field of view 'V2' of the color camera 'V2'. The lengths 'L1' and 'L2' may be measured from the rear of the machine 100. However, it may also be contemplated that the preset threshold 'L' may be of any suitable value. In an example, the preset threshold 'L' may also be based on a user input. The fusion module 210 may then retain the overlaps having lengths greater than or equal to the preset threshold 'L'. The fusion module 210 is further configured to generate a location of the cable 103 along the worksite 100 at or above the ground based on the location of the machine 104, the first location of the cable and the second location of the cable. Specifically, the fusion module 210 may generate the location of the cable 103 based on the overlaps having lengths greater than the preset threshold 'L'. In an embodiment, the fusion module 210 may implement a curve fitting algorithm to determine the location of the cable 103 based on the overlaps. The fusion module 210 may implement any curve fitting algorithm known in the art, for example, a polynomial regression model, a least squares method, and the like.

Referring to FIGS. 1 to 3, the system 102 further includes a server 114 remotely located with respect to the machine 104 and disposed in communication with the processing device 200. The server 114 is configured to record locations of the cable 103 received from the fusion module 210 of the processing device 200 at different instances of time and generate a map of the cable 103 based on the locations of the cable 103. The server 114 may also be configured to determine an avoidance region 130 (shown in FIG. 1) based on the location of the cable 103. The avoidance region 130 may correspond to a region for avoidance by the equipment 120 and personnel. The avoidance region 130 shown in FIG. 1 is exemplary in nature, and the shape and/or size of the avoidance region 130 may also vary based on various factors in addition to the position of the cable 103, such as an amount of slack in the cable 103. The server 114 may also be configured to receive a location of the mobile equipment 120 from a positioning device 122 of the mobile equipment 120. The server 114 may also be configured to provide the map of the cable 103 and avoidance region 130 to a controller (not shown) of the positioning device 122 of the mobile equipment 120. The positioning device 122 of the equipment 120 may be a satellite positioning system, for example Global Positioning System. The positioning device 122 may be disposed at any location on the mobile equipment 120.

INDUSTRIAL APPLICABILITY

The present disclosure is related to the system 102 for tracking the cable 103 connected between the power source 150 and the machine 104, such that the avoidance region 130 may be determined in the worksite 100. The avoidance region 130 may correspond to a region of the worksite 100 defined around the cable 103.

In an embodiment, the server 114 may generate a map of the worksite 100. Alternatively, the server 114 may access a map stored in a database. The server 114 may also determine locations of the mobile equipment 120, the machine 104, the power source 150, the cable 103, various mining regions, and the like on the map. Further, the server 114 may determine the location of the avoidance region 130 on the map of the worksite 100. In case one or more of the mobile equipment 120 are autonomously controlled, the server 114 may regulate the mobile equipment 120 based on the avoidance region 130, for example, by stopping the mobile equipment 120 from entering the avoidance region 130, or by executing an alternative path for the mobile equipment 120 to travel. In case one or more of the mobile equipment 120 are manually controlled, the server 114 may communicate information related to the avoidance region 130 to operators and/or controller (not shown) of the positioning system 122 of the mobile equipment 120, for example, by displaying the location of the avoidance region 130 (and thus the cable 103) on a display or providing other visual and/or audible alarms. Additionally, the server 114 may also communicate information related to the avoidance region 130 to other personnel overseeing various operations in the worksite 100.

The server 114 may update the avoidance region 130 in real time based on various factors, such as changes in the position of the cable 103 and location of the machine 104 during operation. The avoidance region 130 may also be changed based on previous positions of the cable 103. Thus, the avoidance region 130 may enable the mobile equipment 120 and personnel to avoid contact with the cable 103 so as to prevent damage to the cable 103 and/or the mobile equipment 120.

The system 102 also receives data from the laser scanner 106 and the color camera 108, and combines the data to generate the position of the cable 103. In particular, the system 102 detects overlaps between the data from the laser scanner 106 and the color camera 108, and also compares the length of each overlap with the preset threshold 'L'. This may result in accurate determination of the position of the cable 103.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for tracking a cable tethered from a machine along a worksite at or above a surface of the worksite during operation, the system comprising:
- a laser scanner configured to emit a laser beam and scan a surrounding area of the machine within a field of view of the laser scanner;
- a color camera configured to generate images of the surrounding area of the machine within a field of view of the color camera;
- a location unit configured to generate a location of the machine;
- a processing device disposed on the machine and in communication with the laser scanner, the color camera and the location unit, the processing device comprising:
  - a reconstruction module configured to receive data from the laser scanner and generate a three dimensional model of the surrounding area of the machine within the field of view of the laser scanner;
  - an image module configured to receive data from the color camera and generate a two dimensional color image of the surrounding area of the machine within the field of view of the color camera;
  - a first cable detection module configured to receive the three dimensional model from the reconstruction module, the first cable detection module further configured to search for a cylindrical object in the three dimensional model and determine a first location of the cable with respect to the machine based on the location of the cylindrical object within the three dimensional model;
  - a second cable detection module configured to receive the color image from the image module, the second cable detection module further configured to search for a pair of parallel lines in the color image and determine a second location of the cable with respect to the machine based on the location of the pair of parallel lines within the color image; and
  - a fusion module configured to receive the location of the machine from the location unit, the first location of the cable from the first cable detection module and the second location from the second cable detection module, the fusion module further configured to generate a location of the cable based on the location of the machine, the first location of the cable and the second location of the cable; and
- a server remotely located with respect to the machine and disposed in communication with the processing device, the server configured to record locations of the cable at different instances of time and generate a map of the cable based on the locations of the cable.

* * * * *